T. SCHEIE.
EXTENSION RIM FOR TRACTION ENGINE WHEELS.
APPLICATION FILED DEC. 22, 1909.

962,672.

Patented June 28, 1910.

Witnesses
Wm. S. Jordan
N. Langfield

Inventor
Thorger Scheie
by Egerton R. Case,
Atty.

UNITED STATES PATENT OFFICE.

THORGER SCHEIE, OF SPY HILL, SASKATCHEWAN, CANADA.

EXTENSION-RIM FOR TRACTION-ENGINE WHEELS.

962,672.  Specification of Letters Patent.  Patented June 28, 1910.

Application filed December 22, 1909. Serial No. 534,503.

*To all whom it may concern:*

Be it known that I, THORGER SCHEIE, a subject of the King of Great Britain, residing at Spy Hill, in the Province of Saskatchewan, Canada, have invented certain new and useful Improvements in Extension-Rims for Traction-Engine Wheels, of which the following is a specification.

My invention relates to improvements in extension rims for traction-engine wheels, and the principal object of my invention is to make an extension-rim of a plurality of members which can be used in normal position so as to form an ordinary extension-rim, and thus be used when the ground is suitable for its use in this shape; and the members of which can be inverted, when desired, so as to increase the purchase of the traction-wheel on the ground, and the construction of my invention will be hereinafter particularly set forth, and the parts I claim as new will be pointed out in the claims forming part of this specification.

Figure 1:
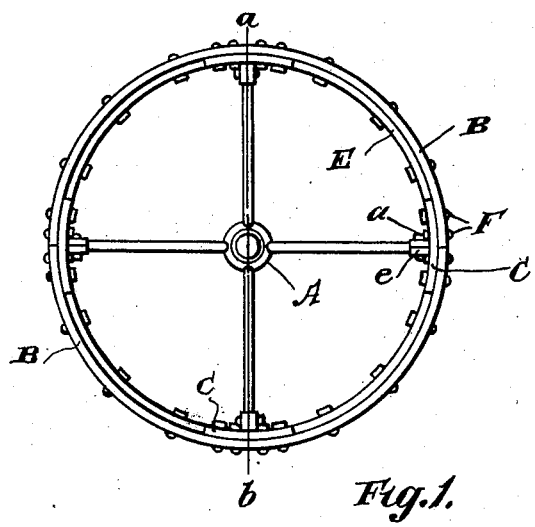
Figure 4:
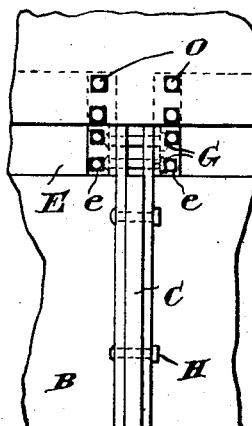
Figure 2:
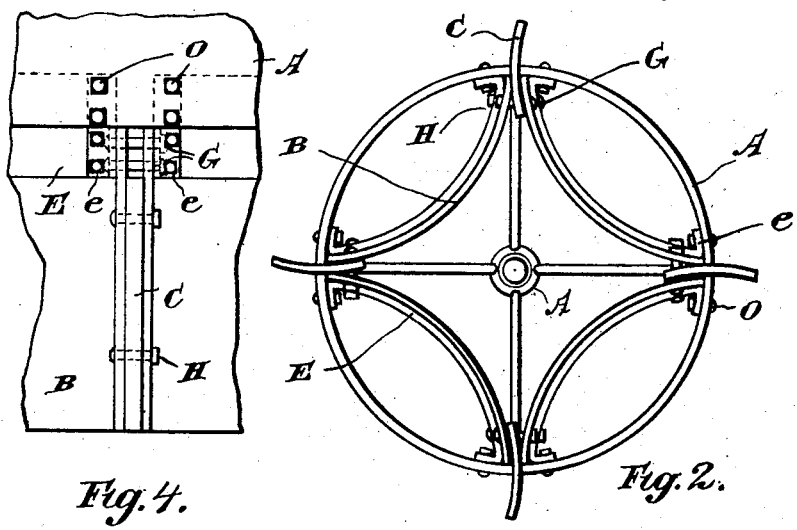
Figure 3:
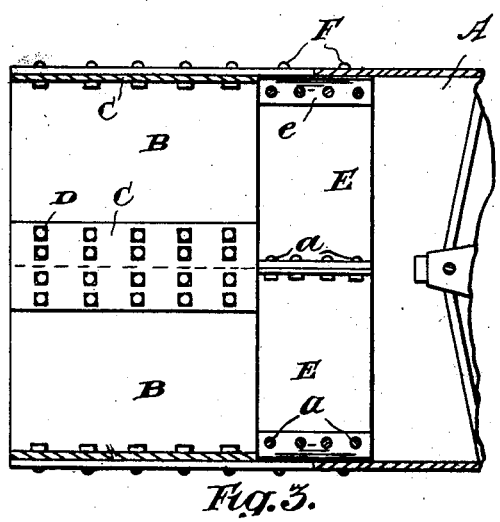

Figure 1 is an end elevation of my extension-rim, showing the sections thereof in normal position and attached to a traction-wheel. Fig. 2 is an end elevation of my extension-rim showing the sections thereof in inverted position. Fig. 3 is a vertical longitudinal section on the line *a—b*, Fig. 1, and Fig. 4 is a detail plan view hereinafter particularly referred to.

In the drawings, like characters of reference indicate corresponding parts in each figure.

As above set forth, I construct an ordinary extension-rim of a plurality of sections, preferably four in number, which, when placed together, will make the extension-rim preferably of the same diameter as the traction wheel to which it is attached. When the ground is very soft, my extension rim will be used in the form illustrated in Figs. 1 and 3, so as to prevent the traction engine from sinking unduly into the soil. For instance, when the traction engine is operating over a plowed field, my extension-rim will be used in the form just mentioned. But when the traction-engine is used in connection with plowing stubble land or breaking sod or when a very heavy load is hitched to the engine, then to safe-guard the engine from getting stuck, the sections of my extension rim will be inverted as shown in Figs. 2 and 4, so as to give the traction wheel the necessary purchase in the ground. Another advantage derived from constructing an extension-rim in sections, is that the different sections can be nested together so as to save considerable space, and so reduce freight charges in transportation. The different parts of my extension-rim can be nested together, and occupy comparatively little space on the traction engine when extension-rim is not in use, and thus permit of the convenient stowing away of the same.

A is any ordinary traction-wheel to which is suitably detachably secured my extension-rim. My extension-rim consists of a plurality of sections B, which are preferably four in number, and so shaped that when placed together in normal position, the extension-rim formed thereby will be preferably of the same diameter as the traction-wheel A. When the sections B are in the position shown in Figs. 1 and 3, they are secured together by the plates C which overlap the adjacent ends of the abutting sections, and are secured to the sections by means of the nuts and bolts D.

My preferred means for securing the sections B to a traction-wheel consists of a plurality of plates E which are curved as shown. The plates E are wide enough to overlap the ends of the sections B adjacent the traction-wheel, and part of the rim of the traction-wheel, as shown in Fig. 3, so that these sections will be firmly attached to the traction-wheel. Nuts and bolts F are used for detachably securing the plates E in place. Each end of each plate E is provided with a flange, *e*. When the plates E are in the position shown in Figs. 1 and 3, the flanges *e* of the adjacent plates abut each other, and they are secured together by means of the nuts and bolts *a*.

In order to invert the sections B, the plates C and E are unbolted and removed, as are also the sections B. The plates E are then inverted and bolted to the traction-wheel A by means of bolts O passing through their flanges *e* (see Fig. 2). The sections B are inverted and between the ends of the sections the plates C are positioned, which plates are then bolted to the said sections by means of the nuts and bolts H. The sections B are then placed against portion of the inner sides of their respective plates E, and they are then bolted to these plates by means of nuts and bolts G. It will be noticed that the plates C project beyond the outer perimeter of the traction-wheel A and thus perform the function of calks or gripping flanges. This position of the plates C gives the traction-wheel A additional purchase in the ground.

Although the traction-wheel is not illustrated in my drawing as being provided with the ordinary calks or gripping flanges, still it will be understood that these elements are employed, although it is not necessary to illustrate the same. Whether or no I use the plates C when the sections B are inverted, will depend upon the condition of the ground. Of course it will be understood that the sections B may be of any desired number, but I find that four sections are the most advantageous for all purposes.

Fig. 4 shows a plan view of one of the plates C and its immediately associated parts, showing more clearly than Fig. 2 how the plates E are attached to the traction-wheel A in their inverted position, and how the sections B are attached to the plates E and to the plates C when in their inverted position.

I do not confine myself to the construction herein shown and described except in so far as that may be rendered necessary by the prior state of the art and the terms of my claims.

What I claim as my invention is—

1. The combination with a traction-wheel, of an extension-rim composed of a plurality of detachable invertible curved sections, and detachable invertible means whereby said sections are attached to said traction-wheel and immovably held in place when inverted.

2. The combination with a traction-wheel, of an extension-rim composed of a plurality of detachable invertible curved-sections; a plurality of invertible curved-plates detachably secured to said traction-wheel and to each of which is detachably secured one of each of said sections so as to hold the same firmly in place when inverted, and detachable invertible-plates for securing together the adjacent sections of said extension-rim and which project beyond the perimeter of said traction-wheel when inverted.

3. The combination with a traction-wheel, of an extension-rim composed of a plurality of detachable invertible curved sections, a plurality of invertible curved plates provided with flanges at each end by means of which the abutting plates are secured together when in normal position, and by means of which the said curved plates are attached to the said wheel when inverted, and which plates hold the said sections firmly in place when inverted, and detachable invertible plates for securing together the adjacent sections of said extension-rim and which project beyond the perimeter of said traction-wheel when inverted.

4. The combination with a traction-wheel, of an extension-rim composed of a plurality of detachable invertible curved sections, and detachable means whereby said sections are attached to said traction-wheel and immovably held in place when inverted.

In testimony whereof I have affixed my signature in presence of two witnesses.

THORGER SCHEIE.

Witnesses:
HARRY WEAKLEY,
A. M. MACBRIDE.